United States Patent
Jesiolowski et al.

(10) Patent No.: US 9,577,723 B1
(45) Date of Patent: Feb. 21, 2017

(54) SYSTEMS AND METHODS OF ANALOG BEAMFORMING FOR DIRECT RADIATING PHASED ARRAY ANTENNAS

(71) Applicant: The Boeing Company, Huntington Beach, CA (US)

(72) Inventors: Jeffrey Matthew Jesiolowski, Playa del Rey, CA (US); Gregory Clayton Busche, Rolling Hills, CA (US); Lindsay E. Krejcarek, Redondo Beach, CA (US); Murat E. Veysoglu, Cypress, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/821,980

(22) Filed: Aug. 10, 2015

(51) Int. Cl.
*H01Q 3/36* (2006.01)
*H04B 7/04* (2006.01)
*H04W 4/06* (2009.01)

(52) U.S. Cl.
CPC .............. *H04B 7/0408* (2013.01); *H04W 4/06* (2013.01)

(58) Field of Classification Search
CPC ........ H01Q 3/04; H01Q 1/246; H01Q 1/1257; H01Q 21/12; H01Q 21/28; H01Q 21/061; H01Q 21/205; H01Q 21/065; H01Q 21/0025; H01Q 1/44; H01Q 5/0048; H01Q 5/0003; H01Q 21/00; H01Q 21/08; H01Q 3/26; H01Q 25/00; G01S 13/60; F41G 7/00; B64G 1/66
See application file for complete search history.

(56) References Cited

U.S. PATENT DOCUMENTS

| | | | |
|---|---|---|---|
| 5,675,343 A * | 10/1997 | Champeau | H01Q 21/296 342/372 |
| 6,362,780 B1 * | 3/2002 | Butz | H01Q 3/26 342/157 |
| 6,366,238 B1 | 4/2002 | DeMore et al. | |
| 6,856,284 B1 | 2/2005 | Cangiani | |
| 7,271,767 B2 | 9/2007 | Londre | |
| 2006/0244669 A1 * | 11/2006 | Mansour | H01Q 3/04 343/757 |

(Continued)

OTHER PUBLICATIONS

Montesinos, J., et al., "Adaptive beamforming for large arrays in satellite communications systems with dispersed coverage," 12 pages.

(Continued)

*Primary Examiner* — Dac Ha
(74) *Attorney, Agent, or Firm* — Armstrong Teasdale LLP

(57) ABSTRACT

A method for processing data from an antenna array including a plurality of elements distributed on opposite sides of a central point is disclosed. The method includes determining an adjustment for a first signal associated with a beam and a first element of the plurality of elements. The first element is located on a first side of the central point of the antenna array. The method includes applying the determined adjustment to the first signal, and applying the determined adjustment to a second signal. The second signal is associated with the beam and a second element of the plurality of elements. The second element is located on a second side of the central point of the antenna array substantially a same distance away from the central point as the first element.

20 Claims, 6 Drawing Sheets

(56) References Cited

U.S. PATENT DOCUMENTS

| | | | |
|---|---|---|---|
| 2009/0167605 A1* | 7/2009 | Haskell | H01Q 3/36 342/372 |
| 2013/0163705 A1* | 6/2013 | Stirland | H01Q 3/26 375/346 |
| 2014/0228036 A1 | 8/2014 | Feria et al. | |
| 2014/0266870 A1 | 9/2014 | Koduru et al. | |
| 2015/0009091 A1* | 1/2015 | Nilsson | H01Q 21/0006 343/893 |

OTHER PUBLICATIONS

Angeletti, Piero, et al., "Hybrid space/ground beamforming techniques for satellite telecommunications," European Space Agency, 6 pages.

Okorogu, V.N., et al., "Design and Simulation of a Low Cost digital Beamforming (DBF) Receiver for Wireless Communication," IJIT-TEE, vol. 2, Issue 2, Jan. 2013.

Aliakbarian, H., et al., "Analogue versus digital for baseband beam Steerable Array used for LEO Satellite Applications," 4 pages.

Greda, Lukasz A., "A Satellite Multibeam Antenna for High-Rate Data Relays," ESA/ESTEC, Noordwijk, The Netherlands, Oct. 5-8, 2010, 5 pages.

Benjamin R et al: "Symmetric-Pair Antennas for Beam Steering, Direction Finding or Isotropic-Reception Gain", IEE Proceedings H. Microwaves, Antennas & Propagation, Institution of Electrical Engineers. Stevenage, GB, vol. 138, No. 4, Aug. 1, 1991 (Aug. 1, 1991), pp. 368-374, XP000260857, ISSN: 8950-107X.

European Search Report for related Application No. 16181652.5-1874, dated Dec. 8, 2016, 8 pages.

* cited by examiner

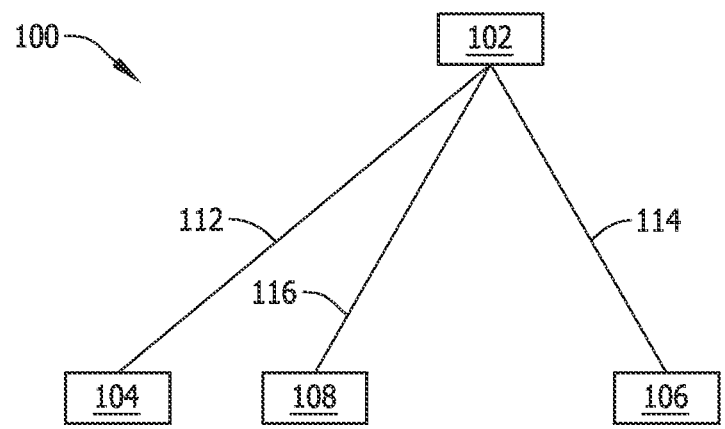

200

| 360 | 362 | 364 | 366 | 368 | 370 | 372 | 374 |
|---|---|---|---|---|---|---|---|
| 300 | 308 | 316 | 324 | 332 | 340 | 348 | 202 |
| 301 | 309 | 317 | 325 | 333 | 341 | 349 | 204 |
| 302 | 310 | 318 | 326 | 334 | 342 | 350 | 206 |
| 303 | 311 | 319 | 327 | 335 | 343 | 351 | 208 |
| 304 | 312 | 320 | 328 | 336 | 344 | 352 | 210 |
| 305 | 313 | 321 | 329 | 337 | 345 | 353 | 212 |
| 306 | 314 | 322 | 330 | 338 | 346 | 354 | 214 |
| 307 | 315 | 323 | 331 | 339 | 347 | 355 | 216 |

Right side labels: 374, 380, 382, 384, 386, 388, 390, 392

SYSTEMS AND METHODS OF ANALOG BEAMFORMING FOR DIRECT RADIATING PHASED ARRAY ANTENNAS

BACKGROUND

The present disclosure relates generally to analog beamforming, and more particularly to systems and methods analog beamforming for direct radiating phased array antennas.

Communications systems, such as satellites, sometimes use multi-beam antennas, such as phased array antennas. Phase array antennas typically include multiple radiating elements, element and signal control circuits, a signal distribution network, a power supply, and a mechanical support structure. Integration of these components can be time-consuming, can be weight-intensive (heavy), and can occupy excessive space.

Some known multi-beam phased array antenna systems include multiple RF inputs, which are referred to as elements. Each element has a single input antenna to capture or radiate RF energy followed by an amplifier. The received input signal is divided into N signals that correspond to an N number of resulting beams after amplification. After division, a beamformer applies amplitude and phase weighting to each channel of each element. For an array of M elements and N beams, there are M times N beamforming paths. The signal energy from each beam and each element is combined in a power combiner, which has an N number of layers. For M elements and N beams, a quantity of N, M-to-one combiners are required.

The large number of phase shifters, summers, multipliers and related components used in some known systems results in a significantly heavy and large communication system. Moreover, the complexity of such systems often results in complex assembly and interconnection requirements.

BRIEF DESCRIPTION

In one aspect, a method for processing data from an antenna array including a plurality of elements distributed on opposite sides of a central point is disclosed. The method includes determining an adjustment for a first signal associated with a beam and a first element of the plurality of elements. The first element is located on a first side of the central point of the antenna array. The method includes applying the determined adjustment to the first signal, and applying the determined adjustment to a second signal associated with the beam and a second element of the plurality of elements. The second element is located on a second side of the central point of the antenna array substantially a same distance away from the central point as the first element.

In another aspect, a method for processing data from a two dimensional antenna array, including a plurality of elements arranged in a first dimension and a second dimension, includes processing a set of signals associated with the plurality of elements in the first dimension, and processing the set of signals in the second dimension after processing the set of signals in the first dimension.

In another aspect, a communications satellite includes a two dimensional antenna array including a plurality of elements arranged in first dimension and a second dimension, and a system communicatively coupled to the plurality of elements and configured to perform beamforming of signals. The system is configured to process a set of signals associated with the plurality of elements in the first dimension and process the set of signals in the second dimension after processing the set of signals in the first dimension.

BRIEF DESCRIPTION OF THE DRAWINGS

FIG. 1 is a simplified block diagram of an example environment including a communications satellite and multiple communications sources.

FIG. 2 is a block diagram of components of the communications satellite of FIG. 1.

DETAILED DESCRIPTION

Figures 3, 4:
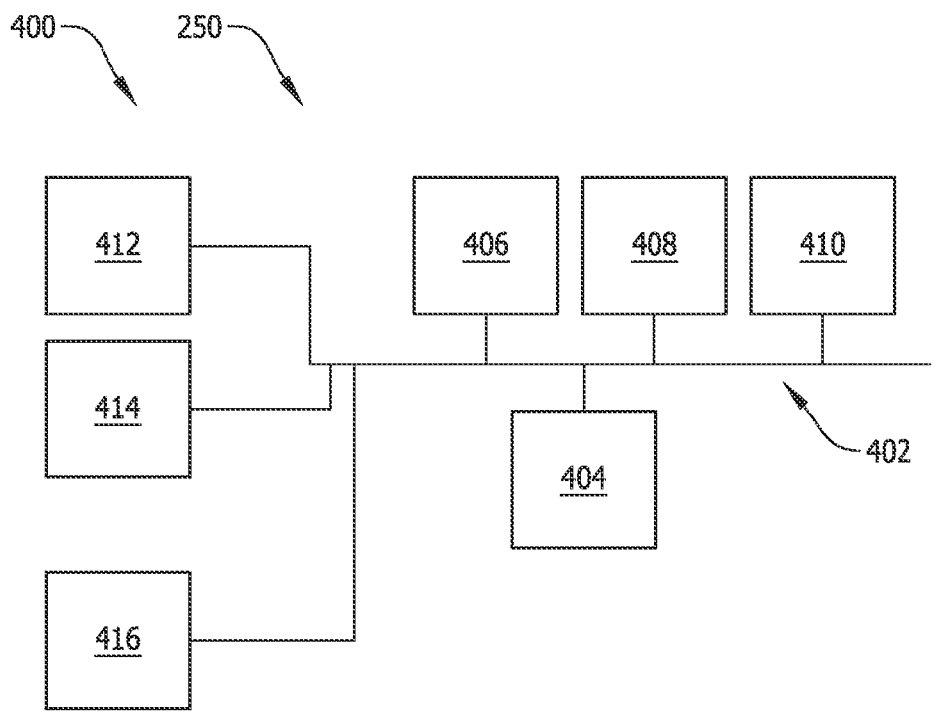
FIG. 3 is a block diagram of antenna elements in a phased array antenna of the satellite of FIG. 1.
FIG. 4 is a block diagram of an example computing device that may be included in the communications satellite of FIG. 1.

FIG. 1 is a simplified block diagram of an example environment 100 including a communications satellite 102, a first communications source 104, a second communications source 106, and a third communications source 108. Communications satellite 102 exchanges communication data with first communications source 104 in a first communications beam 112, with second communications source 106 in a second communications beam 114, and with third communications source 108 in a third communications beam 116. First communications source 104, second communications source 106, and third communications source 108 may be ground-based, air-based, or space-based.

FIG. 2 is a block diagram of components of communications satellite 102. FIG. 2 may be considered a side view of communication satellite 102. It should be understood that communication satellite 102 may include additional components that are not described or shown. Communications satellite 102 includes a phased array antenna 200. More specifically, phased array antenna 200 is programmable or adjustable to selectively receive/transmit signals or beams from/to various directions and/or sources. Phased array antenna 200 includes array elements 202, 204, 206, 208, 210, 212, 214, and 216. Array elements 202, 204, 206, 208, 210, 212, 214, and 216 receive/transmit electromagnetic radiation transmitted from/to one or more sources, for example first communication source 104, second communication source 106, and/or third communication source 108. Coupled to array elements 202, 204, 206, 208, 210, 212, 214, and 216 are phase shifters 218, 220, 222, 224, 226, 228, 230, and 232 and corresponding attenuators 234, 236, 238, 240, 242, 244, 246, and 248. For simplicity of illustration, the number of phase shifters and attenuators shown in FIG. 2 is the same as the number of elements 202, 204, 206, 208, 210, 212, 214, and 216. It should be understood, however, that satellite 102 includes more than one phase shifter per element 202, 204, 206, 208, 210, 212, 214, and 216. A beamformer 250 (sometimes referred to as a beamforming system, a system configured to perform beamforming, or a system) is operatively coupled to phase shifters 218, 220, 222, 224, 226, 228, 230, and 232 and attenuators 234, 236, 238, 240, 242, 244, 246, and 248, transmits control signals thereto to adjust the phase and/or magnitude of received electromagnetic radiation, and forms one or more corresponding beams. Each beam is typically associates with a plurality of elements, a plurality of phase shifters, and a plurality of attenuators. Each beam is received in a corresponding beamport 252, 254, 256, 258, 260, 262, 264, and 266, which is included in or coupled to beamformer 250. In implementations in which beamformer 250 is analog, the number of beamports 252, 254, 256, 258, 260, 262, 264, and 266 is limited by hardware. In implementations in which beamformer 250 is not analog, the number of beamports 252, 254, 256, 258, 260, 262, 264, and 266 is not limited by the hardware. One or more of the processes described herein may be implemented with an analog or a non-analog (e.g., digital) beamformer 250.

FIG. 3 is a block diagram of phased array antenna 200. FIG. 3 may be considered a front view of phased array antenna 200. In addition to array elements 202, 204, 206, 208, 210, 212, 214, and 216, which are also shown in FIG. 2, phased array antenna 200 additionally includes array elements 300-355. Array elements 300-307, 315-216, 202-214, and 308-348 form a periphery of phased array antenna 200. Array elements 300-307 form a first column 360. Array elements 308-315 form a second column 362. Array elements 316-323 form a third column 364. Array elements 324-331 form a fourth column 366. Array elements 332-339 form a fifth column 368. Array elements 340-347 form a sixth column 370. Array elements 348-355 form a seventh column 372, and array elements 202-216 form an eighth column 374. Additionally, array elements 300, 308, 316, 324, 332, 340, 348, and 202 form a first row 378. Array elements 301, 309, 317, 325, 333, 341, 349, and 204 form a second row 380. Array elements 302, 310, 318, 326, 334, 342, 350, and 206 form a third row 382. Array elements 303, 311, 319, 327, 335, 343, 351, and 208 form a fourth row 384. Array elements 304, 312, 320, 328, 336, 344, 352, and 210 form a fifth row 386. Array elements 305, 313, 321, 329, 337, 345, 353, and 212 form a sixth row 388. Array elements 306, 314, 322, 330, 338, 346, 354, and 214 form a seventh row 390, and array elements 307, 315, 323, 331, 339, 347, 355, and 216 form an eighth row 392. In some implementations, phased array antenna 200 is not square or rectangular in shape. For example, in some implementations, phased array antenna 200 is circular, hexagonal, octagonal, or any other suitable shape. Phased array antenna 200 may include any suitable number of array elements, whether more or fewer than the sixty-four elements illustrated in FIG. 3.

FIG. 4 is a block diagram of an example computing device 400 that may be included in communications satellite 102 (shown in FIG. 1). In some implementations, beamformer 250 includes computing device 400. Computing device 400 may include a bus 402, a processor 404, a main memory 406, a read only memory (ROM) 408, a storage device 410, an input device 412, an output device 414, and a communication interface 416. Bus 402 may include a path that permits communication among the components of computing device 400.

Processor 404 may include any type of conventional processor, microprocessor, or processing logic that interprets and executes instructions. Main memory 406 may include a random access memory (RAM) or another type of dynamic storage device that stores information and instructions for execution by processor 404. ROM 408 may include a conventional ROM device or another type of static storage device that stores static information and instructions for use by processor 404. Storage device 410 may include a magnetic and/or optical recording medium and its corresponding drive.

Input device 412 may include a conventional mechanism that permits computing device 400 to receive commands, instructions, or other inputs from a user, including visual, audio, touch, button presses, stylus taps, etc. Additionally, input device may receive location information. Accordingly, input device 412 may include, for example, a camera, a mouse, a microphone, one or more buttons, and/or a touch screen. Output device 414 may include a conventional mechanism that outputs information to a user, including a display (including a touch screen) and/or a speaker. Some implementations do not include input device 412 and/or output device 414. Communication interface 416 may include any transceiver-like mechanism that enables computing device 400 to communicate with other devices and/or systems. For example, communication interface 416 may include mechanisms for communicating with another device, such as phased array antenna 200, communication sources 104, 106, 108 and/or other devices (not shown).

As described herein, computing device 400 facilitates beamforming by transmitting instructions to phase shifters 218, 220, 222, 224, 226, 228, 230, and 232 and attenuators 234, 236, 238, 240, 242, 244, 246, and 248 of phased array antenna 200 to generate multiple beams 112, 114, and/or 116. Computing device 400 may perform these and other operations in response to processor 404 executing software instructions contained in a computer-readable medium, such as memory 406. A computer-readable medium may be defined as a physical or logical memory device and/or carrier wave. The software instructions may be read into memory 406 from another computer-readable medium, such as data storage device 410, or from another device via communication interface 416. The software instructions contained in memory 406 may cause processor 404 to perform processes described herein. In other implementations, hardwired circuitry may be used in place of or in combination with software instructions to implement processes consistent with the subject matter herein. Thus, implementations consistent with the principles of the subject matter disclosed herein are not limited to any specific combination of hardware circuitry and software.

Figure 5:
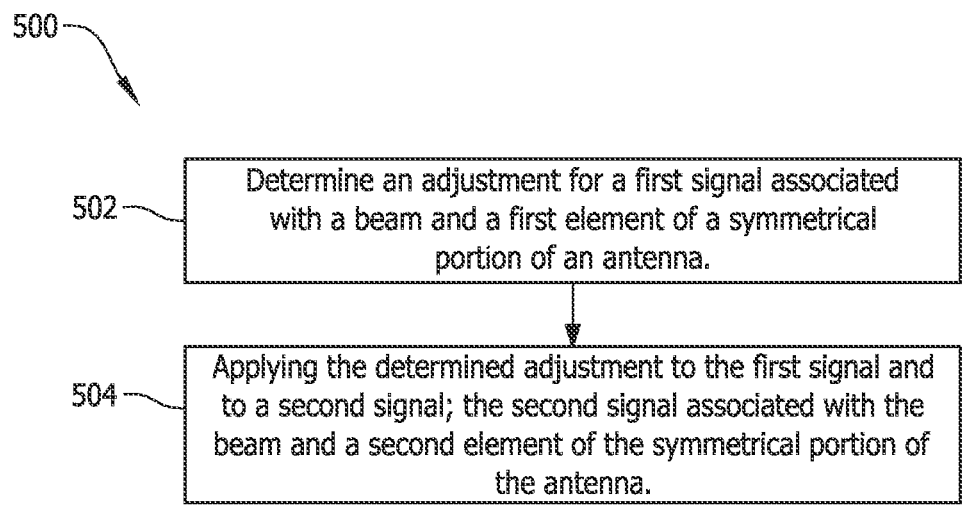
FIG. 5 is a high level flow chart of a process for processing data from an antenna array that may be implemented by the communications satellite of FIG. 1.
Figure 6:
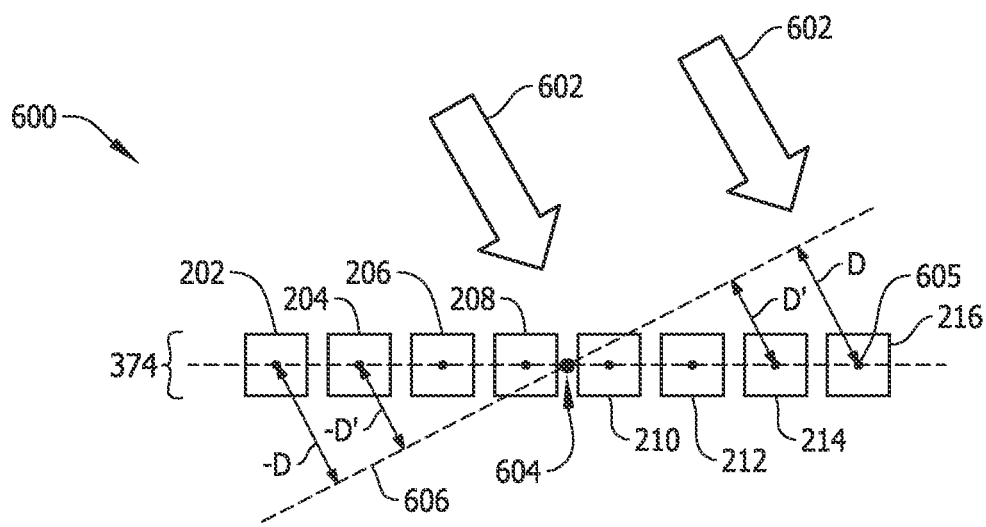
FIG. 6 is a diagram of a column of the antenna shown in FIG. 3 and a direction of plane wave travel for a beam incident on antenna.

FIG. 5 is a high level flow chart of a process 500 for beamforming with a direct radiating phased array antenna, such as antenna 200 (shown in FIG. 3). Process 500 may be used for beamforming for transmission or reception of signals. Process 500 may be implemented by, for example, communications satellite 102 (shown in FIGS. 1 and 2). In other implementations, process 500 is implemented in an aircraft (not shown), a ground-based station (not shown), or any other suitable platform. Process 500 will be described with further reference to FIG. 6. FIG. 6 is a diagram 600 of a symmetrical portion of column 374 of antenna 200 and a direction 602 of plane wave travel for a beam incident on antenna 200. The symmetrical portion of column 374 is substantially symmetrical about a central point 604.

At 502, an adjustment is determined for a first signal associated with a first element, such as element 216, of a symmetrical portion of antenna 200 and a beam. The symmetrical portion of antenna 200 may be any portion of antenna 200 that is substantially symmetrical about a central point. The symmetrical portion of antenna 200 can be, for example, some or all of a row or a column of antenna 200. In the example implementation, the adjustment is a phase shift to be applied to the signal. More specifically, the adjustment is a weighting coefficient to be applied to the signal to phase shift the signal the determined amount. The amount that the received signal is phase shifted is determined based on a path distance D between a center 605 of element 216 and a line 606 perpendicular to direction 602 and passing through central point 604. For element 214, the path distance is a distance D'.

In the example implementation, signals such as the first signal are divided into an in-phase component and a quadrature component. An adjustment is determined for each component of the signal.

The process 500 includes applying 504 the determined adjustment to the first signal associated with the first element and to a second signal associated with a second element, such as element 202, and the beam. With reference to FIG. 6, element 202 is a conjugate of element 216 because they are substantially the same distance from central point 604, but on opposite sides of central point 604. The path distance between element 202 and line 606 is distance −D, which has the same magnitude, but opposite direction from path distance D between element 216 and line 606. This symmetry allows the same weighting to be applied to the signals associated with elements 202 and 216. This reduces the number of weighting coefficients that need to be calculated and reduces the number of components needed for beamforming. The same process may be applied across each conjugate pair of elements in a symmetrical portion of a direct radiating phased array antenna. In FIG. 6, for example, signals from elements 202 and 216 are given the same weighting, signals from elements 204 and 214 are given the same weighting, signals from elements 206 and 212 are given the same weighting, and signals from elements 208 and 210 are given the same weighting.

Figure 7:
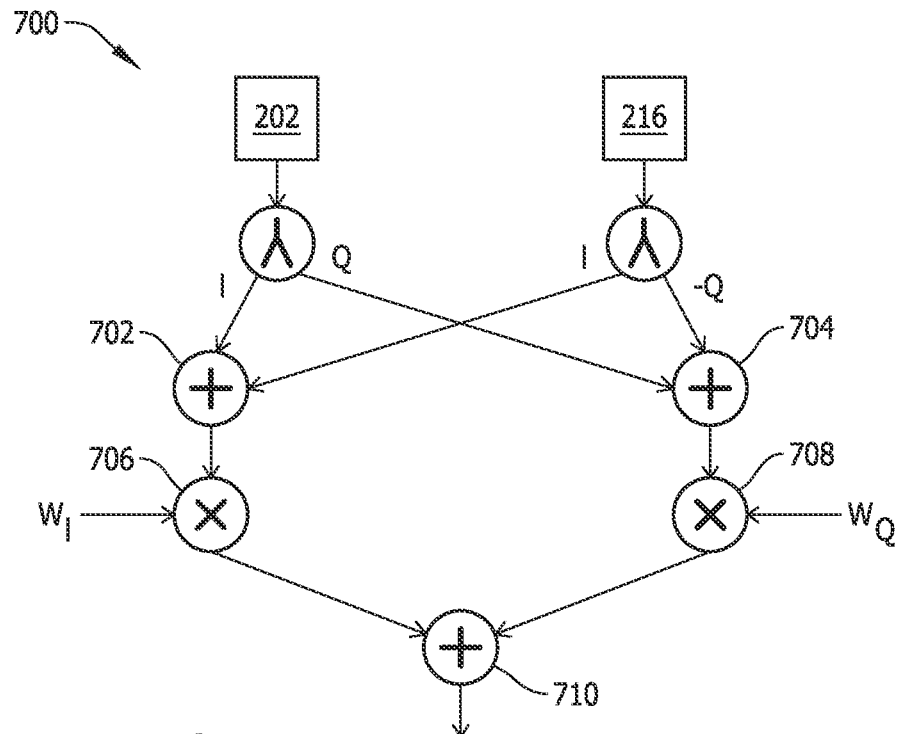
FIG. 7 is a diagram of a portion of the satellite shown in FIG. 1 showing application of weighting coefficients to signals in accordance with the process of FIG. 5.

FIG. 7 is a diagram 700 of a portion of satellite 102 showing application of weighting coefficients to signals from elements 216 and 202 in accordance with the process 500. Unlike known systems that separately calculate and weight the signals from each element, process 500 permits a single set of weighting coefficients to be calculated and applied to signals from conjugate elements on opposite sides of a centerpoint, such as elements 216 and 202. The first signal from element 216 is split into an in phase component I and a quadrature component −Q. The desired adjustment is determined, such as by beamformer 250, for the first signal, and weights $W_I$ and $W_Q$ are calculated for application to the in phase component I and the quadrature component −Q, respectively. The second signal from element 202 is split into an in phase component I and a quadrature component Q. Both in phase components I are summed by a summer 702 and both quadrature components Q and −Q are summed by a summer 704. The summed in phase components are multiplied by the determined in phase weight $W_I$ at multiplier 706 and the summed quadrature components are multiplied by the determined quadrature weight $W_Q$ by multiplier 708. The phase shifted in phase components and the phase shifted quadrature components are then summed by summer 710 and output for use in beamforming.

Figure 8:
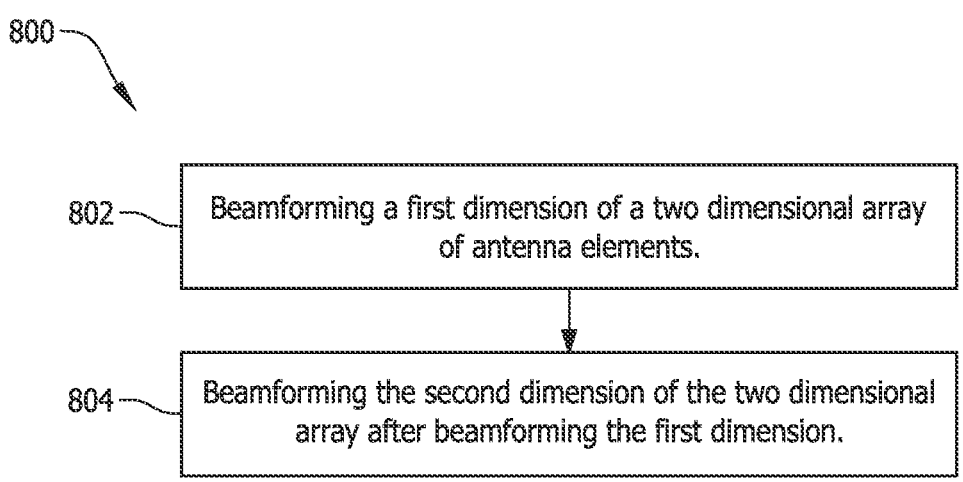
FIG. 8 is a high level flow chart of another process for processing data from an antenna array that may be implemented by the communications satellite of FIG. 1.

FIG. 8 is a high level flow chart of a process 800 for beamforming with a direct radiating phased array antenna, such as antenna 200 (shown in FIG. 3). Process 800 may be used for beamforming for transmission or reception of signals. Process 800 may be implemented by, for example, communications satellite 102 (shown in FIGS. 1 and 2). In other implementations, process 800 is implemented in an aircraft (not shown), a ground-based station (not shown), or any other suitable platform. Process 800 may be performed in combination with process 500 or may be performed in systems that do not perform process 500.

Process 800 includes beamforming 802 a first dimension of a two dimensional array of antenna elements. In the example implementation, beamformer 250 beamforms each row 378, 380, 382, 384, 386, 388, 390, and 392 to create a set of tall, thin column beams. Communication traffic for the elements in each row 378, 380, 382, 384, 386, 388, 390, and 392 may be beamformed using the method 500, or any other suitable method of beamforming. At 804, the second dimension of the two dimensional array of antenna elements is beamformed. In the example implementation, beamformer 250 beamforms each column 360, 362, 364, 366, 368, 370, 372, and 374 to convert the column beams into spot beams. Communication traffic for the elements in each column 360, 362, 364, 366, 368, 370, 372, and 374 may be beamformed using the method 500, or any other suitable method of beamforming.

Figure 9:
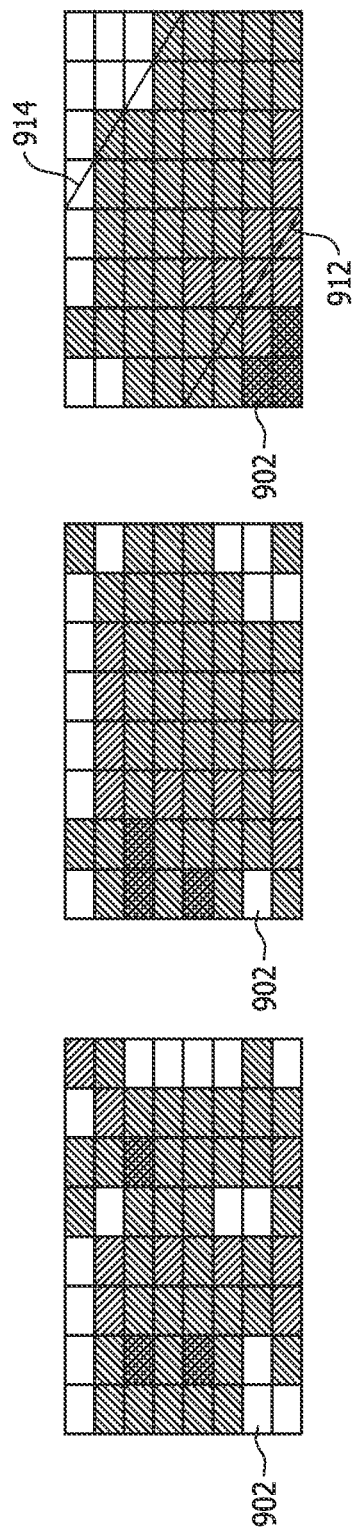
FIGS. 9A-9C are diagrams illustrating a process of beamport sorting for bandwidth that may be implemented by the communications satellite of FIG. 1.

In some implementations, process 800 includes determining bandwidth requirements for the communication traffic (e.g., the signals from/to the array elements). Coefficients may be selectively applied to the beamformed signals to route signals according to bandwidth requirements and bandwidth capacity of particular beamports, such as beamports 252, 254, 256, 258, 260, 262, 264, and 266. FIGS. 9A-9C illustrate an example implementation of beamport sorting for bandwidth. Sixty four beamformed beams 902 of communications traffic are shown for connection to sixty four beamports, similar to beamports 252, 254, 256, 258, 260, 262, 264, and 266. The amount of traffic for each beam 902 is indicated by different shading. Shading 904 indicates no traffic, shading 906 indicates the least traffic, shading 908 indicates the second most traffic, and shading 910 indicates the greatest traffic. In FIG. 9A, the communications traffic is unsorted. FIG. 9B show the results after sorting the traffic by column capacity, and FIG. 9C shows the results after sorting each column in FIG. 9B by rows. Lines 912 and 914 divide the beams 902 into three groups. The beams 902 to the left of line 912 are connected to wideband beamport capable of greater bandwidth transmission. The beams 902 to the right of line 914 are not connected to a beamport. The beams 902 between lines 912 and 914 are connected to lower bandwidth beamports.

Cascading one-dimensional beamforming using process 800 permits a modular system to be used for beamforming Row and column beamformers may be constructed on planar boards, such as printed wiring boards (PWBs) without complex wiring interconnects. Each column of array antenna 200, for example, may have its own beamformer formed on a single PWB and each the column beamformers for each column may be substantially identical. Similarly, each row of antenna 200 may have its own row beamformer on a single PWB that is substantially identical to each other row beamformer.

Figure 10:
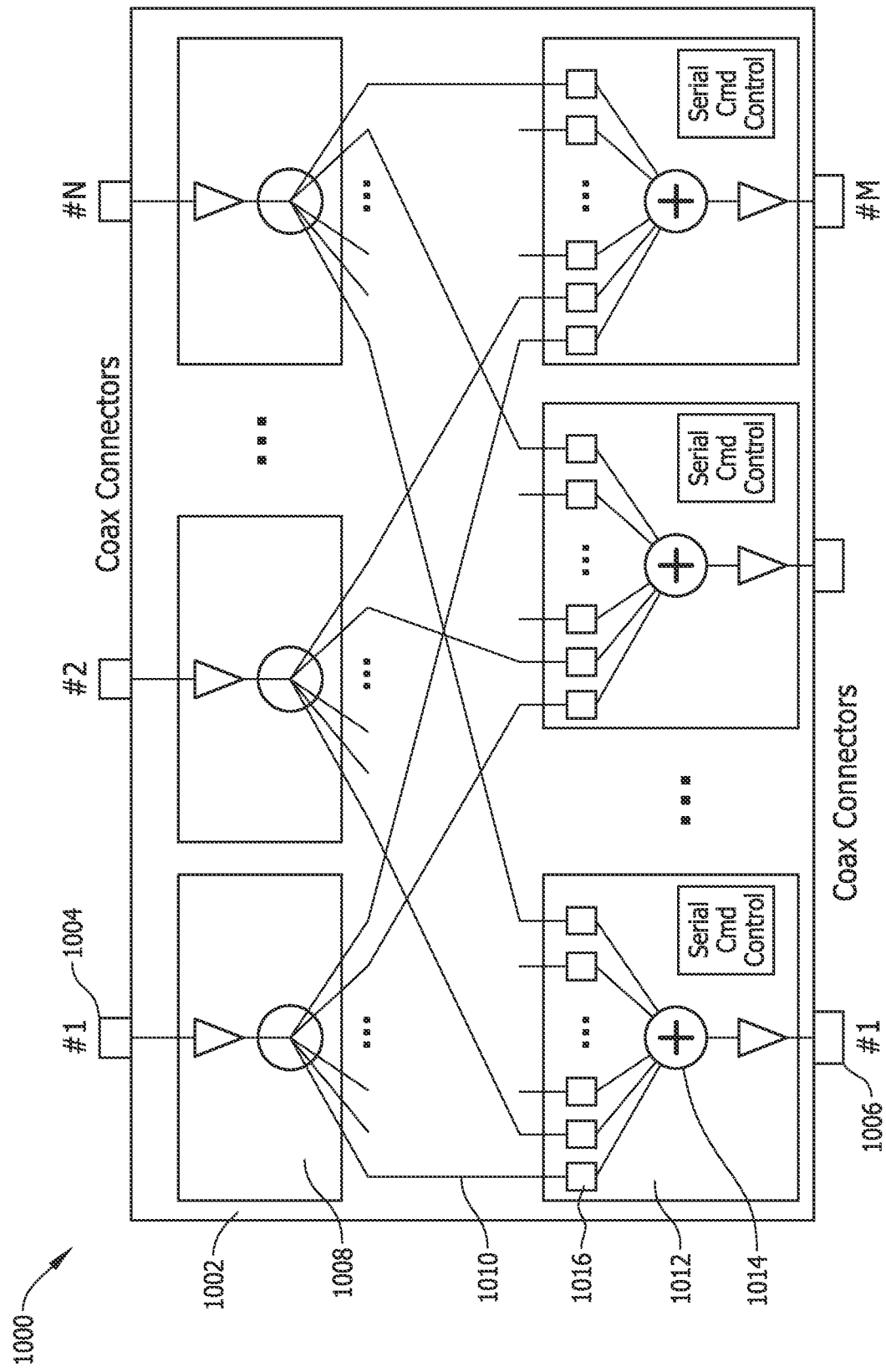
FIG. 10 is a simplified diagram of an example modular beamformer that may be used in the communications satellite of FIG. 1.

FIG. 10 is an simplified diagram of an example modular beamformer 1000 (sometimes referred to as a beamforming system, a system configured to perform beamforming, or a system). Modular beamformer 1000 can be used as a row beamformer or a column beamformer. Modular beamformer 1000 can be used for transmission or reception beamforming. Modular beamformer 1000 includes a board 1002. In the example implementation, board 1002 is a printed wiring board. In other implementations, board 1002 is a printed circuit board or any other board suitable for use in a modular beamformer. Connectors 1004 are used to connect modular beamformer 1000 to array elements of phased array antenna 200. The beamformed output of modular beamformer 1000 is output through connectors 1006. Connectors 1004 and 1006 are coaxial connectors. Alternatively, connectors 1004 may be any other suitable type of connector. Modular beamformer 1000 includes a signal splitting circuit 1008 for each connector 1004. The split signals from each splitting circuit 1008 are distributed by wires 1010 to beamforming circuits 1012. Beamforming circuits 1012 include summers 1014 and programmable amplifiers, delays, and/or phase shifters 1016 to beamform received signals. In some implementations, beamforming circuits 1012 are configured to perform process 500. The beamformed signals are output from beamformer circuit 1012 and modular beamformer 1000 via connectors 1006.

As compared to some known beamforming systems, the implementations described herein reduce the number of components and the complexity of a beamforming system. Implementations that beamform signals associated with elements symmetrically dispersed around a centerpoint reduces the number of weighting factors that must be calculated by half because paired feeds use share the same weighting factor(s). The number of multipliers needed is also reduced by half. Reducing the number of components will typically reduce the size and/or weight of the beamforming systems. Reducing the number of distinct weighting factors that need to be determined may also lead to faster system operation and/or allow the use of less powerful component, such as processors in digital beamforming systems. Implementations that utilize cascaded one-dimensional row beamforming followed by one-dimensional column beamforming reduce the number of phase shifters required by approximately an order of magnitude as compared to conventional beamformers that use one phase shifter per beam per element. Moreover, the row and column beamformers can be implemented on planar PWBs to increase modularity and reduce the complexity of the system and interconnection. Because the example implementations can eliminate intermediate frequency converters associated with digital processors, the implementation may result in fewer up/down-converters being required in a system. The example implementations may also increase efficient use of communications system resources through the use of coefficient manipulation to provide beamport routing based on bandwidth requirements and availability.

A technical effect of systems and methods described herein includes at least one of: (a) determining an adjustment for a first signal associated with a beam and a first element of a plurality of elements; (b) applying the determined adjustment to the first signal; (c) applying the determined adjustment to a second signal associated with the beam and a second element of the plurality of elements; (d) processing a set of signals associated with a plurality of elements in a first dimension; and (e) processing the set of signals in a second dimension after processing the set of signals in the first dimension.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated. This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for processing data from an antenna array including a plurality of elements distributed on opposite sides of a central point, said method comprising:
determining an adjustment for a first signal associated with a beam and a first element of the plurality of elements, the first element located on a first side of the central point of the antenna array;
applying the determined adjustment to the first signal; and
applying the determined adjustment to a second signal associated with the beam and a second element of the plurality of elements, the second element located on a second side of the central point of the antenna array a same distance away from the central point as the first element.

2. The method of claim 1, wherein determining an adjustment for the first signal comprises determining at least one weighting coefficient to be applied to the first signal and the second signal.

3. The method of claim 2, wherein determining at least one weighting coefficient comprises determining an in-phase weighting coefficient and a quadrature weighting coefficient to be applied to the first signal and the second signal.

4. The method of claim 3 further comprising;
determining an in-phase component of each of the first signal and the second signal; and
determining a quadrature component of each of the first signal and the second signal.

5. The method of claim 4 further comprising:
summing the first signal in-phase component and the second signal in-phase component to create a summed in phase signal; and
summing the first signal quadrature component and the second signal quadrature component to create a summed quadrature signal.

6. The method of claim 5, wherein applying the determined adjustment to the first signal and applying the determined adjustment to a second signal comprises weighting the summed in-phase signal with the in-phase weighting coefficient and weighting the summed quadrature signal with the quadrature weighting coefficient.

7. The method of claim 6 further comprising summing the weighted summed in-phase signal and the weighted summed quadrature signal.

8. The method of claim 1, wherein the antenna array comprises a direct radiating array antenna.

9. A communications satellite comprising:
a two dimensional antenna array including a plurality of elements arranged in a plurality of rows in a first dimension and a plurality of columns in a second dimension, wherein each of the plurality of rows comprises elements of the plurality of elements distributed on opposite sides of a central point;
a system communicatively coupled to said plurality of elements and configured to perform beamforming of signals, said system configured to:
determine an adjustment for a first signal associated with a first element in a row, the first element located on a first side of the central point of the row;
apply the determined adjustment to the first signal; and
apply the determined adjustment to a second signal associated with a second element in the row, the second element located on a second side of the central point of the row a same distance away from the central point as the first element.

10. The communications satellite of claim 9, wherein said system is configured to process the set of signals in the first dimension by beamforming the set of signals by rows, and said beamformer is configured to process the set of signals in the second dimension by beamforming the set of signals by columns after beamforming the set of signals by rows.

11. The communications satellite of claim 10, wherein said system is configured to determine an adjustment for the first signal by determining an in-phase weighting coefficient and a quadrature weighting coefficient to be applied to the first signal and the second signal.

12. The communications satellite of claim 11, wherein said system is configured to:
determine an in-phase component of each of the first signal and the second signal;
sum the first signal in-phase component and the second signal in-phase component to create a summed in phase signal;
determine a quadrature component of each of the first signal and the second signal; and
sum the first signal quadrature component and the second signal quadrature component to create a summed quadrature signal.

13. The communications satellite of claim 12, wherein said system is configured to apply the determined adjustment to the first signal and apply the determined adjustment to a second signal by weighting the summed in-phase signal with the in-phase weighting coefficient and weighting the summed quadrature signal with the quadrature weighting coefficient.

14. The communications satellite of claim 13, wherein said system is further configured to sum the weighted summed in-phase signal and the weighted summed quadrature signal.

15. The communications satellite of claim 9, wherein said system configured to:
process, with a separate beamformer for each of the plurality of rows, a set of signals associated with the plurality of elements in the first dimension; and
process, with a separate beamformer for each of the plurality of columns, the set of signals in the second dimension after processing the set of signals in the first dimension.

16. A communications satellite comprising:
an antenna array including a plurality of elements arranged distributed on opposite sides of a central point; and
a system communicatively coupled to said plurality of elements and configured to perform beamforming of signals, said system configured to:
determine an adjustment for a first signal associated with a beam and a first element of the plurality of elements, the first element located on a first side of the central point of the antenna array;
apply the determined adjustment to the first signal; and
apply the determined adjustment to a second signal associated with the beam and a second element of the plurality of elements, the second element located on a second side of the central point of the antenna array a same distance away from the central point as the first element.

17. The communications satellite of claim 12, wherein said antenna array is a two dimensional antenna array including a plurality of elements arranged in a plurality of rows in a first dimension and a plurality of elements arranged in a plurality of columns in a second dimension, and wherein said system is configured to process the set of signals in the first dimension by beamforming the set of signals by rows, and said beamformer is configured to process the set of signals in the second dimension by beamforming the set of signals by columns after beamforming the set of signals by rows.

18. The communications satellite of claim 17, wherein said system is configured to determine an adjustment for the first signal by determining an in-phase weighting coefficient and a quadrature weighting coefficient to be applied to the first signal and the second signal.

19. The communications satellite of claim 18, wherein said system is configured to:
determine an in-phase component of each of the first signal and the second signal;
sum the first signal in-phase component and the second signal in-phase component to create a summed in phase signal;
determine a quadrature component of each of the first signal and the second signal; and
sum the first signal quadrature component and the second signal quadrature component to create a summed quadrature signal.

20. The communications satellite of claim 19, wherein said system is configured to apply the determined adjustment to the first signal and apply the determined adjustment to a second signal by weighting the summed in-phase signal with the in-phase weighting coefficient and weighting the summed quadrature signal with the quadrature weighting coefficient.

* * * * *